(12) United States Patent
Kang et al.

(10) Patent No.: US 11,644,923 B2
(45) Date of Patent: May 9, 2023

(54) TOUCH DISPLAY PANEL

(71) Applicant: HANNSTAR DISPLAY CORPORATION, Taipei (TW)

(72) Inventors: Mu-Kai Kang, Tainan (TW);
Jing-Xuan Chen, Tainan (TW);
Cheng-Yen Yeh, Taichung (TW);
Sz-Kai Huang, Taichung (TW)

(73) Assignee: HANNSTAR DISPLAY CORPORATION, Taipei (TW)

( * ) Notice: Subject to any disclaimer, the term of this patent is extended or adjusted under 35 U.S.C. 154(b) by 0 days.

(21) Appl. No.: 17/730,228

(22) Filed: Apr. 27, 2022

(65) Prior Publication Data
US 2022/0374125 A1    Nov. 24, 2022

(30) Foreign Application Priority Data

May 21, 2021    (CN) .......................... 202110559709.5

(51) Int. Cl.
*G06F 3/041*   (2006.01)
*G06F 3/044*   (2006.01)

(52) U.S. Cl.
CPC ........ *G06F 3/04164* (2019.05); *G06F 3/0412* (2013.01); *G06F 3/0445* (2019.05); *G06F 3/0446* (2019.05)

(58) Field of Classification Search
CPC .. G06F 3/04164; G06F 3/0445; G06F 3/0446; G06F 3/0412
See application file for complete search history.

(56) References Cited

U.S. PATENT DOCUMENTS

2020/0033972 A1*   1/2020   Huang .............. G02F 1/136286

* cited by examiner

*Primary Examiner* — Deeprose Subedi
(74) *Attorney, Agent, or Firm* — Winston Hsu

(57) ABSTRACT

The present invention provides a touch display panel. The substrate includes a display region and a non-display region. The first conductive pads, the second conductive pads, the first conductive lines and the second conductive lines are disposed in the non-display region. The first conductive lines are electrically connected to the first conductive pads and the sub-pixels in the display region. The second conductive lines are electrically connected to the second conductive pads and the touch electrodes in the display region. The second conductive line includes a first line segment, a second line segment and a third line segment. The first line segment extends in a first direction and is connected to the second conductive pad. The second line segment extends from the non-display region to the display region. The third line segment extends in a second direction and is connected to the first line segment and the second line segment.

9 Claims, 6 Drawing Sheets

TOUCH DISPLAY PANEL

BACKGROUND OF THE INVENTION

1. Field of the Invention

The present invention relates to a touch display panel, and more particularly, to a touch display panel with a narrow border.

2. Description of the Prior Art

Touch devices have been widely applied to display panels of all kinds of electronic products to form touch display devices. This allows users to communicate directly with electronic products instead of using traditional input devices such as a keyboard or mouse. The volume of electronic products can thereby be reduced and the convenience of communication between human and computer can be enhanced. In recent years, the industry has been devoted to developing an in-cell touch display device, wherein the touch device is integrated into the display panel to minimize the volume of the touch display device.

In the non-display region of the conventional touch display panel, the reduction of the width of the bottom border of the touch display panel is limited due to the limitation of manufacturing process. Therefore, how to effectively reduce the width of the bottom border of the touch display panel to achieve the narrow border design of the touch display panel is one of the technical problems that needs to be solved at present.

SUMMARY OF THE INVENTION

One of the technical problems to be solved by the present invention is that the bottom border cannot be further reduced due to the limitation of the manufacturing process in the conventional touch display panel.

To solve the above technical problem, the present invention provides a touch display panel including a substrate, a plurality of first conductive pads, a plurality of second conductive pads, a plurality of first conductive lines and a plurality of second conductive lines. The substrate includes a display region and a non-display region, wherein the non-display region is disposed on at least one side of the display region. The first conductive pads and the second conductive pads are disposed in the non-display region. The first conductive lines are disposed in the non-display region, wherein the first conductive lines are electrically connected to the first conductive pads, and the first conductive lines are electrically connected to a plurality of sub-pixels in the display region. The second conductive lines are disposed in the non-display region, wherein the second conductive lines are electrically connected to the second conductive pads, and the second conductive lines are electrically connected to a plurality of touch electrodes in the display region. One of the second conductive lines includes a first line segment, a second line segment and a third line segment. The first line segment extends in a first direction and is connected to one of the second conductive pads. The second line segment extends from the non-display region to the display region. The third line segment extends in a second direction, wherein an end of the third line segment is connected to the first line segment, another end of the third line segment is connected to the second line segment, and the second direction is not parallel to the first direction.

In the touch display panel of the present invention, the layout of the signal lines in the non-display region can be simplified through the wiring design of the second conductive lines, and the width of the bottom border of the touch display panel can further be reduced. In addition, since the first conductive lines and the second conductive lines do not cross each other in the non-display area, the manufacturing process can be simplified and the signal interference can be reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
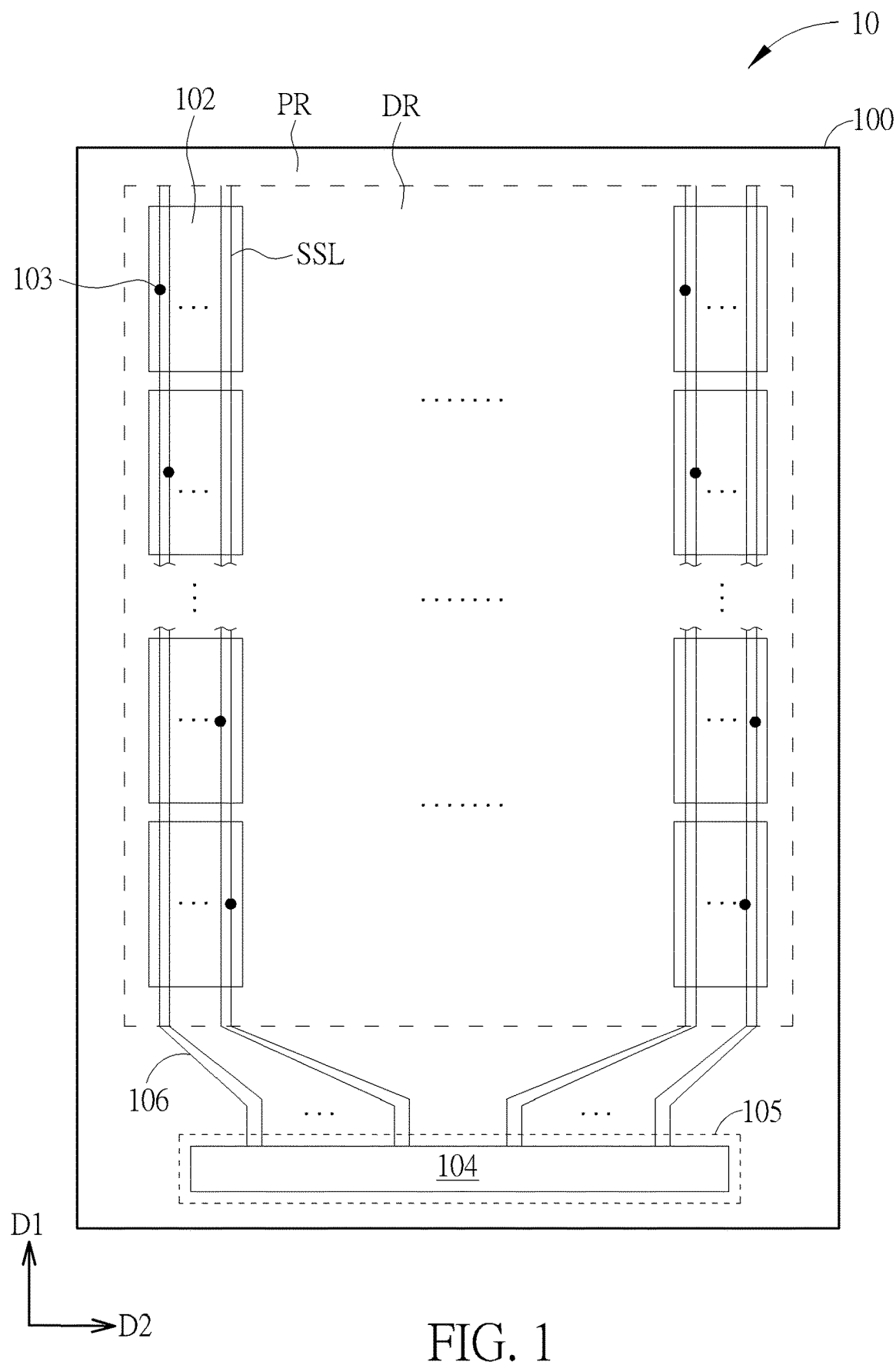
FIG. 1 is a schematic diagram illustrating a top view of a touch portion of a touch display panel according to a first embodiment of the present invention.

To provide a better understanding of the present invention to those skilled in the art, embodiments will be detailed as follows. The embodiments of the present invention are illustrated in the accompanying drawings to elaborate on the contents and effects to be achieved. It should be noted that the drawings are simplified schematics, and therefore show only the components and combinations associated with the present invention, so as to provide a clearer description of the basic architecture or method of implementation. The components would be complex in reality. In addition, for ease of explanation, the components shown in the drawings may not represent their actual number, shape, and dimensions; details can be adjusted according to design requirements.

Figure 2:
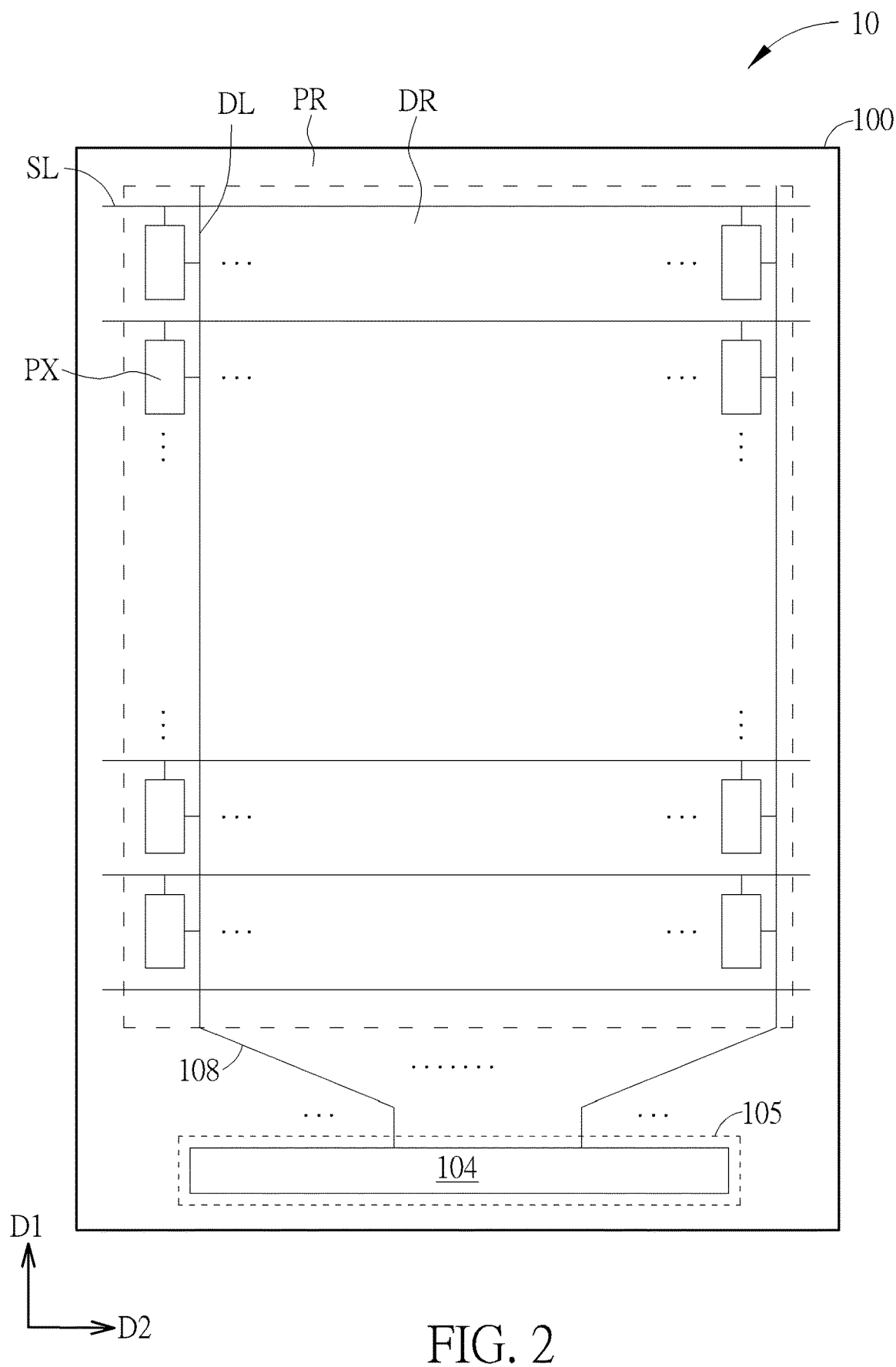
FIG. 2 is a schematic diagram illustrating a top view of a display portion of the touch display panel according to the first embodiment of the present invention.

Referring to FIG. 1 and FIG. 2, FIG. 1 is a schematic diagram illustrating a top view of a touch portion of a touch display panel according to a first embodiment of the present invention, and FIG. 2 is a schematic diagram illustrating a top view of a display portion of the touch display panel according to the first embodiment of the present invention. For simplifying the drawings and for ease of comprehension, FIG. 1 omits some image displaying related components in the display region DR, and FIG. 2 omits some touch sensing related components in the display region DR. For example, a touch display panel 10 of this embodiment may be an in-cell liquid crystal touch display panel, but not limited thereto. As shown in FIG. 1, a substrate 100 of the touch display panel 10 includes a display region DR and a non-display region PR disposed on at least one side of the display region DR. In this embodiment, the non-display region PR surrounds the display region DR, but it is not limited thereto. The substrate 100 may be a rigid substrate, such as a glass substrate, plastic substrate, quartz substrate, or sapphire substrate, or the substrate 100 may be a flexible substrate including materials such as polyimide (PI) or polyethylene terephthalate (PET) for example, but not limited thereto. A plurality of touch electrodes 102 are disposed in the display region DR of the substrate 100, and the touch electrodes 102 are separated from each other. The touch electrodes 102 can be arranged into a plurality of columns and a plurality of rows, and the touch electrodes 102 can be arranged in the matrix manner, but not limited thereto. The touch electrode columns extend in a first direction D1, the touch electrode rows extend in a second direction D2, and the first direction D1 and the second direction D2 are not parallel. The first direction D1 is perpendicular to the second direction D2 in this embodiment, but not limited thereto. The arrangement or the number of the touch electrodes 102 may be different according to different designs of the touch display panel 10.

The touch display panel 10 includes a plurality of touch signal lines SSL disposed on the substrate 100. The touch signal lines SSL can substantially extend along the first direction D1 in the display region DR, but not limited thereto. For example, the touch signal lines SSL can extend in a curve fashion or a zigzag fashion along the first direction D1 in some embodiments. One of the touch signal lines SSL is electrically connected to one of the touch electrodes 102. Accordingly, each of the touch signal lines SSL is electrically connected to a corresponding touch electrode 102 to transmit and/or receive touch related signals. Each touch signal line SSL is electrically connected to the corresponding touch electrode 102 through a connecting structure 103. For example, the touch signal line SSL and the touch electrode 102 can be electrically connected through a via formed between the touch electrode signal line SSL and the touch electrode 102, but not limited thereto.

The touch display panel 10 includes an integrated circuit (IC) 104 disposed in the non-display region PR and disposed on the substrate 100. In addition, the substrate 100 includes a bonding area 105 disposed in the non-display region PR, and the IC 104 may be disposed in the bonding area 105. The touch display panel 10 includes a plurality of conductive lines 106 (or referred to as the second conductive lines) disposed in the non-display region PR, and the conductive lines 106 can be electrically connected to the touch signal lines SSL in the display region DR. In addition, the conductive lines 106 may be electrically connected to the IC 104, thereby electrically connecting the IC 104 to the touch electrodes 102 through the conductive lines 106 and the touch signal lines SSL.

As shown in FIG. 2, a plurality of scan lines SL and a plurality of data lines DL are disposed on the substrate 100, the scan lines SL can extend along the second direction D2, and the data lines DL can extend along the first direction D1, but not limited thereto. In some embodiments, the data lines DL can extend in a curve fashion or a zigzag fashion along the first direction D1. The data lines DL cross the scan lines SL to define a plurality of sub-pixels PX in the display region DR, and the sub-pixels PX may be arranged in the matrix manner for example, but not limited thereto. Each of the sub-pixels PX can emit a light with the corresponding color, thereby enabling the display region DR of the touch display panel 10 to display an image. In this embodiment, each of the touch electrodes 102 in FIG. 1 may be formed by common electrodes of the corresponding sub-pixels PX in FIG. 2, and these common electrodes are electrically connected to each other. Therefore, one of the touch electrodes 102 includes a plurality of common electrodes and corresponds to a plurality of sub-pixels PX. Accordingly, the touch electrodes 102 in this embodiment can be used as the common electrodes during a display period of the touch display panel 10, and can be used to sense the touch position of the user during a touch sensing period of the touch display panel 10, but not limited thereto. The common electrodes corresponding to different touch electrodes are separated.

The touch display panel 10 includes a plurality of conductive lines 108 (or referred to as the first conductive lines) disposed in the non-display region PR, and the conductive lines 108 can be electrically connected to the data lines DL in the display region DR. In addition, the conductive lines 108 may be electrically connected to the IC 104, thereby electrically connecting the IC 104 to the sub-pixels PX through the conductive lines 108 and the data lines DL.

In this embodiment, the IC 104 may include a source driver circuit and a touch sensing circuit, and the IC 104 may be disposed on the substrate 100 in the form of a chip, but not limited thereto. In some embodiments, the IC 104 may be in the form of a chip and disposed on a flexible or rigid circuit board and then electrically connected to the touch signal lines SSL or the data lines DL on the substrate 100. In this embodiment, the IC 104 transmits and/or receives touch sensing signals or display signals (such as gray scale signals), but not limited thereto.

In addition, the scan lines SL may be electrically connected to a gate driver circuit (not shown) in the non-display region PR, and the gate driver circuit may be electrically connected to the IC 104. For example, the IC 104 can output control signals to the gate driver circuit so that the gate driver circuit can drive the sub-pixels PX through the scan lines SL.

Figure 3:
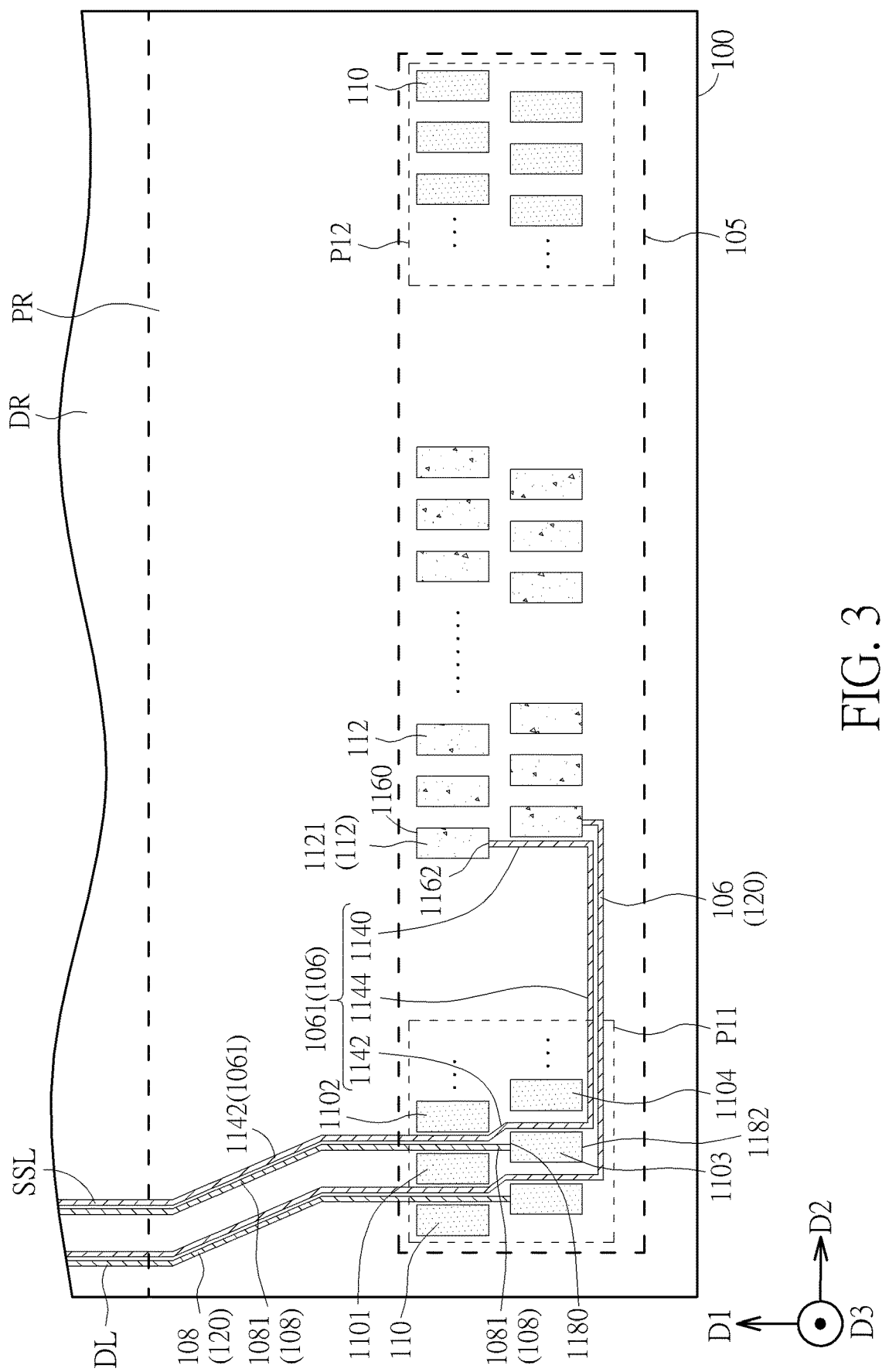
FIG. 3 is a partially enlarged schematic diagram of the touch display panel according to the first embodiment of the present invention.

Referring to FIG. 3, it is a partially enlarged schematic diagram of the touch display panel according to the first embodiment of the present invention. The touch display panel 10 includes a plurality of conductive pads 110 (or referred to as the first conductive pads) and a plurality of conductive pads 112 (or referred to as the second conductive pads) disposed on the substrate 100 and in the bonding area 105 in the non-display region PR. In this embodiment, the conductive pads 110 include a first portion P11 and a second portion P12. In FIG. 3, the conductive pads 112 are disposed between the first portion P11 of the conductive pad 110 and the second portion P12 of the conductive pad 110 in the second direction D2. The first portion P11 of the conductive pads 110, the conductive pads 112 and/or the second portion P12 of the conductive pads 110 may be arranged in two rows, but the number of the rows is not limited thereto. In addition, as shown in FIG. 3, one conductive pad 110 is electrically connected to one conductive line 108, and one conductive pad 112 is electrically connected to one conductive line 106. Therefore, the conductive pads 110 can be electrically connected to the sub-pixels PX in the display region DR, and the conductive pads 112 can be electrically connected to the touch electrodes 102 in the display region DR.

In this embodiment, the IC 104 in FIG. 1 or FIG. 2 may for example be a chip, and a plurality of bonding pads may be disposed on the chip. When the IC 104 is disposed on the substrate 100, at least a portion of the bonding pads are corresponded to and electrically connected to the conductive pads 110 and the conductive pads 112 in FIG. 3. Therefore, the source driver circuit in the IC 104 can transmit the display signals to the sub-pixels PX, and the touch sensing circuit in the IC 104 can transmit the touch sensing signals to the touch electrodes 102.

As shown in FIG. 3, each of the conductive lines 106 may include a first line segment 1140, a second line segment 1142 and a third line segment 1144, but not limited thereto. Taking one of the conductive lines 106 (such as the conductive line 1061) in FIG. 3 as an example, the first line segment 1140 extends in the first direction D1, and one end of the first line segment 1140 is connected to one of the conductive pads 112 (such as the conductive pad 1121). The conductive pad 112 includes a first side edge 1160 and a second side edge 1162, and the first side edge 1160 is disposed between the second side edge 1162 and the display region DR. Taking the conductive pad 1121 as an example, the first line segment 1140 of the conductive line 1061 is connected to the second side edge 1162 of the conductive pad 1121. In another aspect, the first line segment 1140 extends from the conductive pad 1121 in a direction opposite to the display region DR.

Another end of the first line segment 1140 is connected to one end of the third line segment 1144, and the third line segment 1144 extends in the second direction D2. As shown in FIG. 3, for a portion of the conductive pads 112 disposed on the left side, the conductive lines 106 connected to these conductive pads 112 can extend leftward to the first portion P11 of the conductive pads 110 through the third line segments 1144. For a portion of the conductive pads 112 disposed on the right side, the conductive lines 106 (not shown) connected to these conductive pads 112 may extend rightward to the second portion P12 of the conductive pad 110 through the third line segments 1144.

The third line segment 1144 of the conductive line 1061 is disposed on one side (such as the lower side) of the conductive pads 110 in the first direction D1, and therefore a portion of the conductive pads 110 are disposed between the third line segments 1144 of the conductive lines 106 and the display region DR. Another end of the third line segment 1144 is connected to an end of the second line segment 1142, the second line segment 1142 extends from the non-display region PR toward the display region DR, and another end of the second line segment 1142 can be connected to the touch signal line SSL. The second line segment 1142 may include a plurality of bending portions, but the second line segment 1142 may still substantially extend along the first direction D1.

The third line segment 1144 of the conductive line 1061 at the lower side of the conductive pads 110 and 112 can extend leftward in the second direction D2 to the vicinity of the corresponding touch signal line SSL, then the conductive line 1061 can extend upward and penetrate through the first portion P11 of the conductive pads 110 via the second line segment 1142, and the conductive line 1061 can be connected to the corresponding touch signal line SSL. Therefore, the arrangement of signal lines in the non-display region PR can be simplified, and the width of the bottom border of the touch display panel 10 can be further reduced. In addition, the wire crossing between the conductive lines 106 and other signal lines on the substrate 100 can be avoided to simplify the manufacturing process and reduce the signal interference.

In addition, a portion of the second line segment 1142 is disposed between adjacent two of the conductive pads 110 in the second direction D2. As shown in FIG. 3, a portion of the second line segment 1142 is disposed between the conductive pads 1101 and 1102 of the first row of the conductive pads 110 in the second direction D2, and another portion of the second line segment 1142 is disposed between the conductive pads 1103 and 1104 in the second row of the conductive pads 110 in the second direction D2.

The conductive pad 110 includes a first side edge 1180 and a second side edge 1182, and the first side edge 1180 is disposed between the second side edge 1182 and the display region DR. Taking the conductive pad 1103 as an example, an end of one conductive line 108 (such as the conductive line 1081) is connected to the first side edge 1180 of the conductive pad 1103. In another aspect, the conductive line 1081 extends from the conductive pad 1103 in the direction toward the display region DR, and another end of the conductive line 1081 may be connected to the data line DL. The conductive line 1081 may be disposed next to a portion of the second line segment 1142 of the conductive line 1061 in the second direction D2. In addition, a portion of the conductive line 1081 is disposed between the conductive pads 1101 and 1102 in the first row of the conductive pads 110 in the second direction D2. Furthermore, the extending direction of a portion of the conductive line 1081 and the extending direction of a portion of the second line segment 1142 of the conductive line 1061 may be parallel or substantially parallel to each other.

In this embodiment, the touch display panel 10 includes a conductive layer 120 disposed on the substrate 100, and the conductive layer 120 includes the conductive lines 108 and the conductive lines 106, but not limited thereto. Since the conductive lines 108 and the conductive lines 106 are formed from the same conductive layer, the conductive lines 108 and the conductive lines 106 are required to be separated from each other for the electrical isolation. As shown in FIG. 3, a portion of the second line segment 1142 of the conductive line 1061 is separated from the conductive line 1081.

In addition, the data lines DL and the conductive lines 108 may be formed from the same conductive layer or different conductive layers. The data lines DL and the conductive lines 108 can be electrically connected through contact holes or vias when the data lines DL and the conductive lines 108 are formed from different conductive layers. The touch signal lines SSL and the conductive lines 106 may be formed from the same conductive layer or different conductive layers. The touch signal lines SSL and the conductive lines 106 can be electrically connected through contact holes or vias when the touch signal lines SSL and the conductive lines 106 are formed from different conductive layers.

In addition, the conductive pads 110 and the conductive lines 108 may be formed from the same conductive layer or different conductive layers. The conductive pads 110 and the conductive lines 108 can be electrically connected through contact holes or vias when the conductive pads 110 and the conductive lines 108 are formed from different conductive layers. The conductive pads 112 and the conductive lines 106 may be formed from the same conductive layer or different conductive layers. The conductive pads 112 and the conductive lines 106 can be electrically connected through contact holes or vias when the conductive pads 112 and the conductive lines 106 are formed from different conductive layers.

The layout of the signal lines in the non-display region PR can be simplified through the wiring design of the conductive lines 106 of the present invention, and the width of the bottom border of the touch display panel 10 can be further reduced. In addition, the conductive lines 106 and the conductive lines 108 do not cross each other in the non-display region PR due to the wiring design of the conductive lines 106 of the present invention, thereby simplifying the manufacturing process and reducing the signal interference.

The above-mentioned design that the conductive line 1061 penetrates through the first portion P11 of the conductive pads 110 can also be applied to the second portion P12 of the conductive pads 110. For example, the conductive lines 106 connected to some conductive pads 112 disposed on the right side may extend rightward and upward and penetrate through the second portion P12 of the conductive pads 110.

The touch display panel of the present invention is not limited to the aforementioned embodiment. The following description continues to detail other embodiments. To simplify the description and show the difference between other embodiments and the above-mentioned embodiment, identical components in each of the following embodiments are marked with identical symbols, and the identical features will not be redundantly described.

Figure 4:
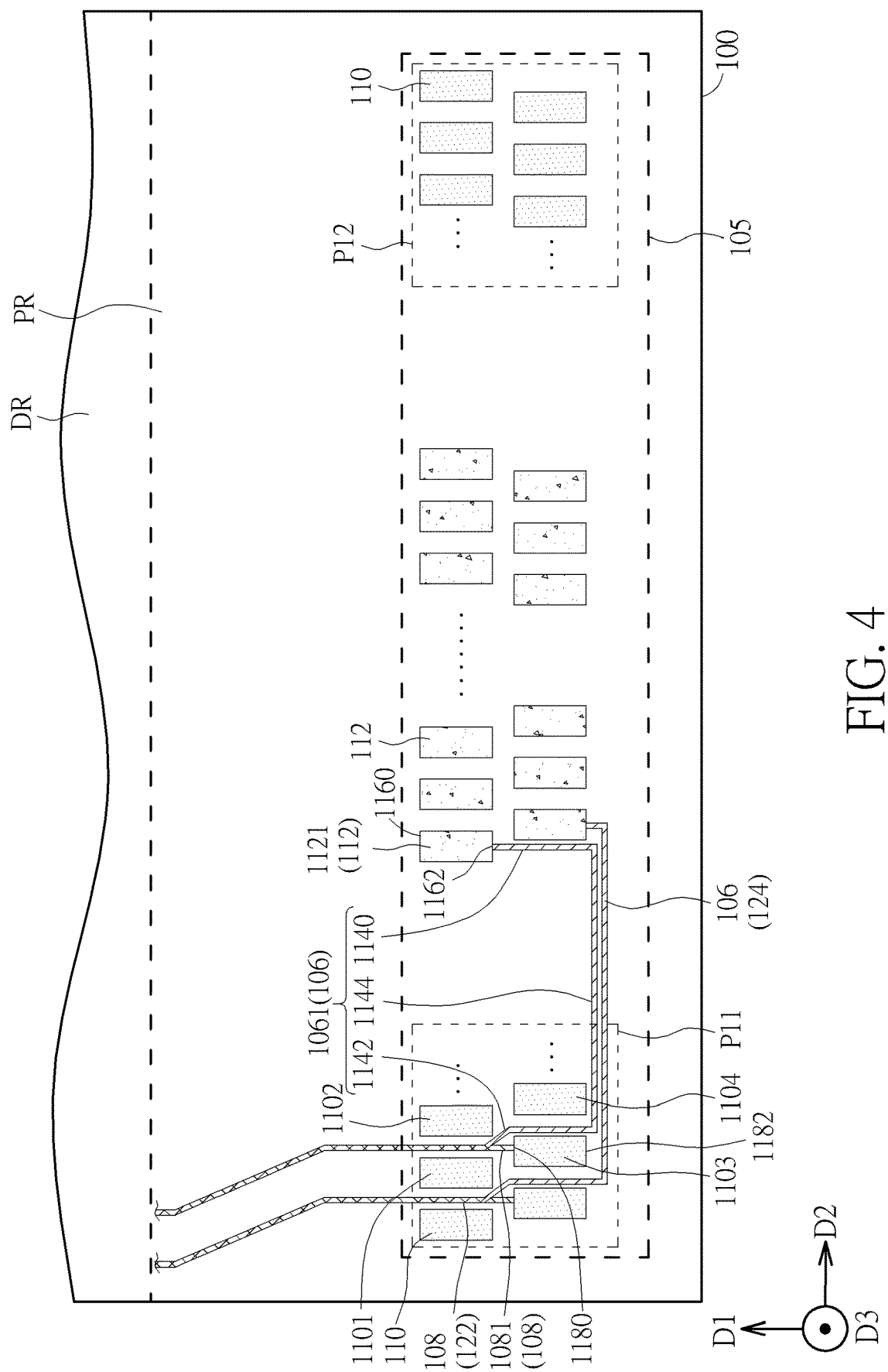
FIG. 4 is a partially enlarged schematic diagram of the touch display panel according to a second embodiment of the present invention.

Referring to FIG. 4, it is a partially enlarged schematic diagram of the touch display panel according to a second embodiment of the present invention. The differences between this embodiment and the first embodiment (as shown in FIG. 3) are that the touch display panel 10 includes a conductive layer 122 and a conductive layer 124 disposed on the substrate 100, wherein the conductive layer 122 includes the conductive lines 108 and the conductive layer 124 includes the conductive lines 106, but not limited thereto. In a third direction D3, the conductive layer 122 may be disposed above or below the conductive layer 124, and the touch display panel 10 may include an insulating layer disposed between the conductive layer 122 and the conductive layer 124 to electrically isolate the conductive layer 122 from the conductive layer 124. The third direction D3 may be perpendicular to the first direction D1, the second direction D2 or a surface of the substrate 100.

In this embodiment, since the conductive lines 106 and the conductive lines 108 are formed from different conductive layers and are electrically isolated from each other, a portion of the second line segment 1142 of one of the conductive lines 106 (such as the conductive line 1061) can be partially overlapped with one of the conductive lines 108 (such as the conductive line 1081) in the third direction D3. The area occupied by the conductive lines 106 and 108 in the non-display region PR can be further reduced through the wiring design of this embodiment, and the width of the bottom border of the touch display panel 10 can also be further reduced.

The above-mentioned design that the conductive lines 1061 and 1081 can be partially overlapped can also be applied to the second portion P12 of the conductive pads 110. For example, the conductive lines 106 connected to some conductive pads 112 disposed on the right side may extend rightward and upward and penetrate through the second portion P12 of the conductive pads 110, and the adjacent conductive line 106 and conductive line 108 may be partially overlapped. Other technical features of this embodiment can be the same as those of the first embodiment, the same effects as those of the first embodiment can be achieved in this embodiment, and they will not be described redundantly.

Figure 5:
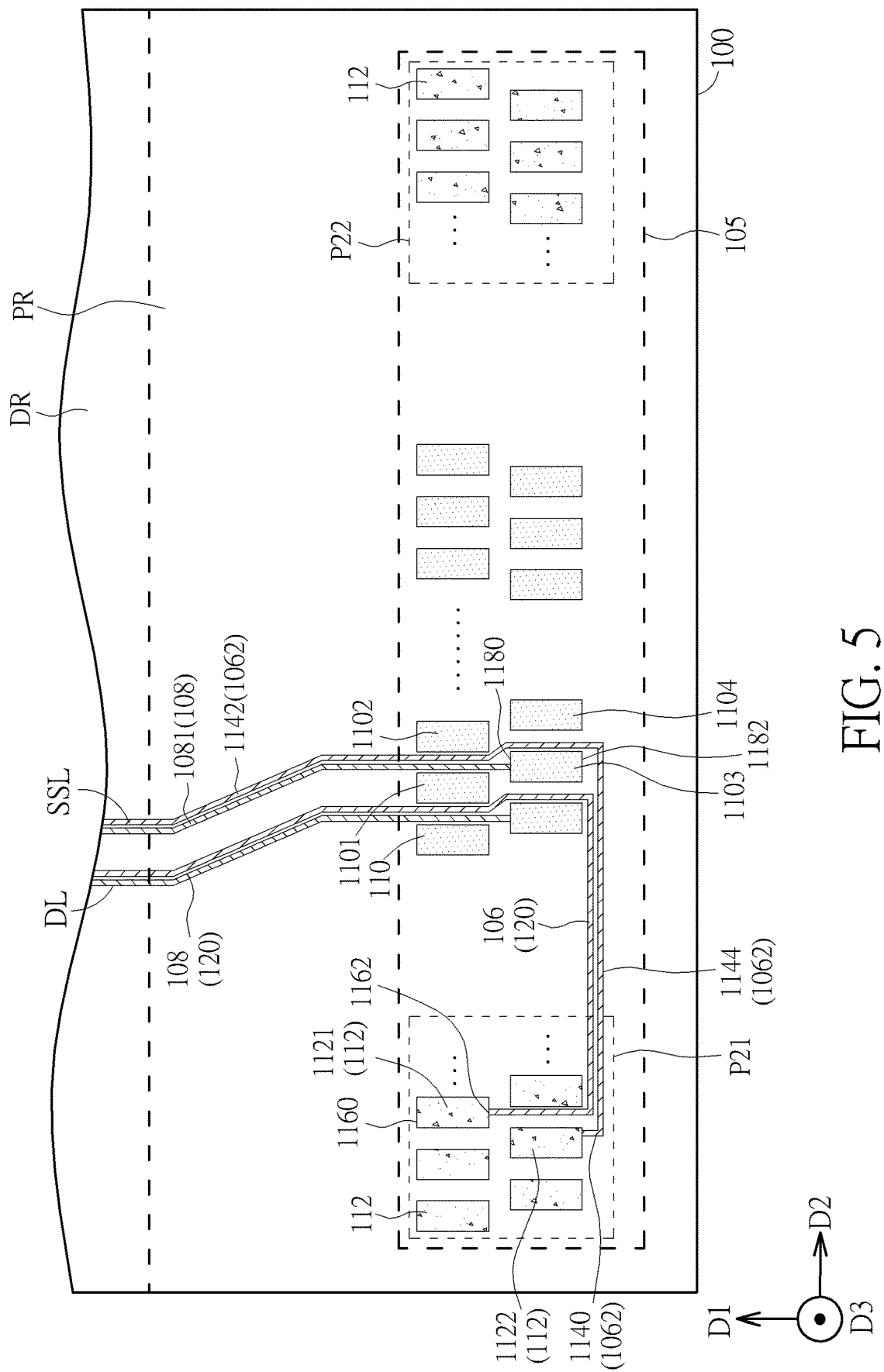
FIG. 5 is a partially enlarged schematic diagram of the touch display panel according to a third embodiment of the present invention.

Referring to FIG. 5, it is a partially enlarged schematic diagram of the touch display panel according to a third embodiment of the present invention. The difference between this embodiment and the first embodiment (as shown in FIG. 3) is that the conductive pads 112 include a first portion P21 and a second portion P22. In FIG. 5, the conductive pads 110 are disposed between the first portion P21 of the conductive pads 112 and the second portion P22 of the conductive pads 112 in the second direction D2. In addition, the first portion P21 of the conductive pads 112, the conductive pads 110 and/or the second portion P22 of the conductive pads 112 may be arranged in two rows, but the number of the rows is not limited thereto.

Taking one of the conductive pads 112 (such as the conductive pad 1122) in the first portion P21 and one of the conductive lines 106 (such as the conductive line 1062) in FIG. 5 as an example, the third line segment 1144 of the conductive line 1062 at the lower side of the conductive pads 110 and 112 can extend rightward in the second direction D2 to the vicinity of the corresponding touch signal line SSL, then the conductive line 1062 can extend upward and penetrate through the conductive pads 110 via the second line segment 1142, and the conductive line 1062 can be connected to the corresponding touch signal line SSL. In the conductive line 1062, a portion of the second line segment 1142 is disposed between the conductive pad 1101 and the conductive pad 1102 of the first row of the conductive pads 110 in the second direction D2, and another portion of the second line segment 1142 is disposed between the conductive pad 1103 and the conductive pad 1104 of the second row of the conductive pads 110 in the second direction D2.

The above-mentioned design that the conductive line 1062 penetrates through the conductive pads 110 can also be applied to the second portion P22 of the conductive pads 112. For example, the conductive lines 106 connected to the second portion P22 of the conductive pads 112 may extend leftward and upward and penetrate through the conductive pads 110. In addition, the conductive lines 108 and 106 in this embodiment are both formed from the conductive layer 120, thus the conductive lines 108 and 106 are required to be separated from each other for the electrical isolation. Other technical features of this embodiment can be the same as those of the first embodiment, the same effects as those of the first embodiment can be achieved in this embodiment, and they will not be described redundantly.

Figure 6:
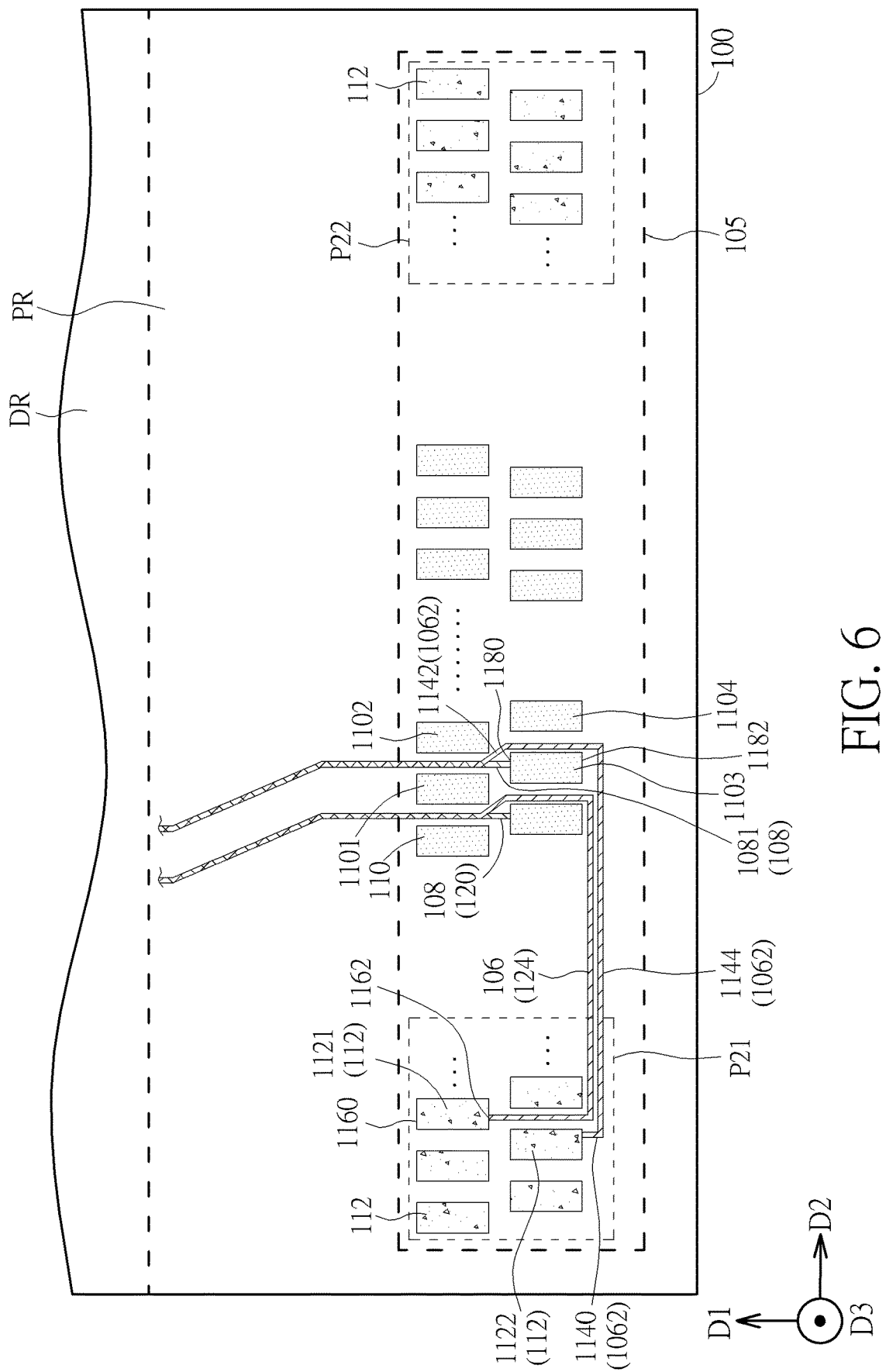
FIG. 6 is a partially enlarged schematic diagram of the touch display panel according to a fourth embodiment of the present invention.

Referring to FIG. 6, it is a partially enlarged schematic diagram of the touch display panel according to a fourth embodiment of the present invention. The difference between this embodiment and the third embodiment (as shown in FIG. 5) is that the touch display panel 10 includes a conductive layer 122 and a conductive layer 124 disposed on the substrate 100, wherein the conductive layer 122 includes the conductive lines 108 and the conductive layer 124 includes the conductive lines 106, but not limited thereto. In the third direction D3, the conductive layer 122 may be disposed above or below the conductive layer 124, and the touch display panel 10 may include an insulating layer disposed between the conductive layer 122 and the conductive layer 124 to electrically isolate the conductive layer 122 from the conductive layer 124.

In this embodiment, since the conductive lines 106 and the conductive lines 108 are formed by different conductive layers and are electrically isolated from each other, a portion of the second line segment 1142 of one of the conductive lines 106 (such as the conductive line 1062) can be partially overlapped with one of the conductive lines 108 (such as the conductive line 1081) in the third direction D3. The area occupied by the conductive lines 106 and 108 in the non-display region PR can be further reduced due to the wiring design of this embodiment, and the width of the bottom border of the touch display panel 10 can also be further reduced.

The above-mentioned design that the conductive lines 1062 and 1081 can be partially overlapped can also be applied to the second portion P22 of the conductive pads 112. For example, the conductive lines 106 connected to the second portion P22 of the conductive pads 112 may extend leftward and upward and penetrate through the conductive pads 110, and the adjacent conductive line 106 and conductive line 108 may be partially overlapped. Other technical features of this embodiment can be the same as those of the third embodiment or the first embodiment, the same effects as those of the first embodiment can be achieved in this embodiment, and they will not be described redundantly.

To sum up, in the touch display panel of the present invention, the second conductive lines in the non-display region are electrically connected to the touch signal lines in the display region, the second conductive line includes the first line segment, the second line segment and the third line segment, and the third line segment connects the first line segment and the second line segment. The first line segment is connected to the conductive pad used for touch sensing, and the first line segment extends from the conductive pad toward the direction opposite to the display region. The third line segment at the lower side of the conductive pads extends laterally to the vicinity of the corresponding touch signal line. The second line segment extends from the non-display region toward the display region, the second line segment extends upward and penetrates through the conductive pads used for image display, and the second line segment is connected to the corresponding touch signal line. The layout of the signal lines in the non-display region can be simplified through the wiring design of the second conductive lines of the present invention, and the width of the bottom border of the touch display panel can be further reduced. In addition, the first conductive lines do not cross the second conductive lines in the non-display region, thereby simplifying the manufacturing process and reducing the signal interference.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch display panel, comprising:
   a substrate comprising a display region and a non-display region, wherein the non-display region is disposed on at least one side of the display region;
   a plurality of first conductive pads and a plurality of second conductive pads disposed in the non-display region;
   a plurality of first conductive lines disposed in the non-display region, wherein the first conductive lines are electrically connected to the first conductive pads, and the first conductive lines are electrically connected to a plurality of sub-pixels in the display region; and
   a plurality of second conductive lines disposed in the non-display region, wherein the second conductive lines are electrically connected to the second conductive pads, and the second conductive lines are electrically connected to a plurality of touch electrodes in the display region, wherein one of the second conductive lines comprises:
      a first line segment extending in a first direction and connected to one of the second conductive pads;
      a second line segment extending from the non-display region to the display region; and
      a third line segment extending in a second direction, wherein an end of the third line segment is connected to the first line segment, another end of the third line segment is connected to the second line segment, and the second direction is not parallel to the first direction,
   wherein a portion of the second line segment is disposed between adjacent two of the first conductive pads in the second direction.

2. The touch display panel according to claim 1, wherein the first conductive pads comprise a first portion and a second portion, and the second conductive pads are disposed between the first portion of the first conductive pads and the second portion of the first conductive pads in the second direction.

3. The touch display panel according to claim 1, wherein the second conductive pads comprise a first portion and a second portion, and the first conductive pads are disposed between the first portion of the second conductive pads and the second portion of the second conductive pads in the second direction.

4. The touch display panel according to claim 1, wherein a portion of the second line segment is disposed next to one of the first conductive lines in the second direction.

5. The touch display panel according to claim 4, wherein the portion of the second line segment is separated from the one of the first conductive lines.

6. The touch display panel according to claim 5, further comprising a conductive layer disposed on the substrate, wherein the conductive layer comprises the first conductive lines and the second conductive lines.

7. The touch display panel according to claim 1, wherein a portion of the second line segment is partially overlapped with one of the first conductive lines.

8. The touch display panel according to claim 7, further comprising:
   a first conductive layer disposed on the substrate, wherein the first conductive layer comprises the first conductive lines; and
   a second conductive layer disposed on the substrate, wherein the second conductive layer comprises the second conductive lines, and the first conductive layer and the second conductive layer are electrically isolated.

9. The touch display panel according to claim 1, wherein one of the second conductive pads comprises a first side edge and a second side edge, the first side edge is disposed between the second side edge and the display region, and the first line segment is connected to the second side edge.

* * * * *